Nov. 25, 1924.                                                                   1,516,671
                              J. A. D'ARCY
                              SHUTTLE TIP
                           Filed June 19, 1924
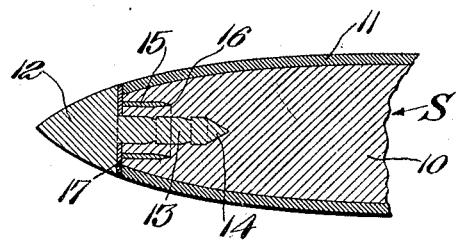
Witness:
Alfred H. McGlinchey
Inventor:
John A. D'Arcy
by his attorneys
Van Duren Fish Hildreth & Cary Patented Nov. 25, 1924.

1,516,671

UNITED STATES PATENT OFFICE.

JOHN A. D'ARCY, OF WOONSOCKET, RHODE ISLAND, ASSIGNOR TO SHAMBOW SHUTTLE COMPANY, OF WOONSOCKET, RHODE ISLAND, A CORPORATION OF RHODE ISLAND.

SHUTTLE TIP.

Application filed June 19, 1924. Serial No. 720,965.

*To all whom it may concern:*

Be it known that I, JOHN A. D'ARCY, a citizen of the United States, residing at Woonsocket, in the county of Providence and State of Rhode Island, have invented certain new and useful Improvements in Shuttle Tips; and I do hereby declare the following to be a full, clear, and exact description of the invention, such as will enable others skilled in the art to which it appertains to make and use the same.

The present invention relates to loom shuttles.

A shuttle is usually provided with a steel tip which is conically shaped and has a shank which is driven into a hole formed in the end of the wooden body of the shuttle. Ordinarily the hole in the end of the shuttle body which receives the shank of the shuttle tip is made slightly deeper than the length of the shank of the tip, so as to prevent the end of the shank from bottoming in the hole. In the use of the shuttle the impact of the shuttle against the picker tends to loosen the tip in the shuttle body. Owing to the change in the angle at which the picker engages the tip during impact when the shuttle flight is arrested, different portions of the surface of the tip are struck with a resulting tendency of the blow to turn the tip in the shuttle body. Long continued use will gradually result in loosening the tip so that it will turn in the shuttle body, and while it will not free itself from the shuttle body entirely, the turning of the tip in the shuttle body will result in the exposure of a minute crack between the base of the head of the tip and the wood of the shuttle body. This minute crack is liable to catch and sometimes does catch the weft or the warp, and causes damage.

One object of the invention is to produce a construction wherein the tip is prevented from turning in the shuttle body so as thereby to reduce the liability of forming a crack between the base of the tip and the wood.

In fibre covered shuttles the fibre of which the covering is made is peculiarly susceptible to variations in the humidity of the atmosphere, and the fibre being more or less hygroscopic, it absorbs moisture and thereby swells. This elongates the fibre cover and causes pressure to be exerted by the end of the covering on the base of the head of the tip. This causes the compression of that part of the fibre adjacent to the base of the head of the tip, and results when the humidity has altered and the cover has dried out, in the opening up of a crack between the end of the fibre cover and the base of the tip, which is objectionable for the reasons above stated. Brass washers have been employed between the base of the head and the shuttle tip and the end of the body of the shuttle, but in use they seem to aggravate rather than to ameliorate the objection residing in the opening of the crack between the shuttle body and the base of the head of the tip.

In order to reduce the liability of the formation of this crack, the present invention contemplates in one aspect the use of a fibre washer between the base of the head and the shuttle tip of the body of the shuttle, with the object of inserting the tip of the shuttle body with greater security so as to prevent the formation of a crack between the base of the tip and the tip. The invention consists in the improvement hereinafter described and particularly defined in the claims.

In the accompanying drawing illustrating the preferred form of the invention, a longitudinal sectional view of the end of a shuttle is shown.

The illustrated embodiment of the invention is described as follows: The shuttle, indicated in a general way by the reference character S, has a main body portion 10 of wood which is covered with a fibre cover 11. The hardened steel tip 12 of the shuttle is provided with a shank 13, the end of which is squared and tapered as at 14, so that it presents a pyramidal, non-round end. A ferrule 15 is employed, made of seamless steel and having its inner end 16 provided with a sharp edge. This ferrule performs the office usually performed by the ferrule employed, in that it strengthens the shuttle body around the shank of the tip. A washer 17 of black fibre is interposed between the end of the shuttle body and the base of the head of the tip. The shuttle body is prepared in the usual way by applying the fibre covering and squaring the ends in which a hole is bored to receive the shank of the tip. This hole is not as long as the shank of the tip which it is to receive, as a result of which, when the parts are assembled, the tapered, pyramidal or non-round end of the shank makes a hole for itself in the wood, and closely fits such hole by being driven thereinto. The shuttle body is also provided with an annular recess of less depth than the length of the ferrule which it is to receive. Then the ferrule is inserted in the recess until the edge of the inner end of the ferrule strikes the bottom thereof, the steel tip with the fibre washer in position on the shank is applied, and the shank is pushed into the hole in the end of the shuttle prepared to receive it as far as it will easily go, and then the steel tip, and with it the ferrule, are driven together into the end of the shuttle. The driving of the ferrule into the end of the shuttle secures it firmly and rigidly in place, the driving of the tapered end of the shank into the wood of the shuttle body causes it to displace the wood as it enters, so that the wood embraces and closely presses against the non-round end of the shank of the tip, and the considerable pressure with which the tip is driven home compresses the fibre washer between the base of the head of the tip and the body of the shuttle. Then the edge of the washer extending beyond the surface of the shuttle body and the outer surface of the shuttle body adjacent thereto and the end of the steel tip, are reduced to final form, thereby producing a smooth, continuous surface from the point of the tip to its base and over the surface of the edge of the washer and on to the fibre covered body of the shuttle.

While the use of a shuttle tip held from rotation in the body of the shuttle is of advantage in wooden shuttles by reason of the added security which it confers against the loosening of the shuttle tip and the opening of a crack between the base of the head of the shuttle tip and the body of the shuttle, it is of more especial advantage and of increased value in connection with a fibre covered shuttle because of the greater expansion and contraction of the fibre cover than of uncovered wood.

Having thus described the invention, what is claimed is:

1. A shuttle having a wooden body portion, a steel tip provided with a shank having a pyramidal end driven into the wood of the shuttle body and by reason of its non-round form held from rotation in the shuttle body, and a fibre washer between the base of the head of the shuttle tip and the end of the shuttle body being in compressed condition so that by its elasticity it may expand and contract under varying conditions of humidity, the holding of the tip from rotation and the elasticity of the washer preventing the opening of a crack between the head of the tip and the shuttle body.

2. A shuttle as defined in claim 1, wherein the body of the shuttle is covered with fibre, the latter covering extending to and engaging the fibre washer under the base of the head of the tip so that expansion and contraction of the fibre cover is compensated for by the compressed fibre washer.

In testimony whereof I have signed my name to this specification.

JOHN A. D'ARCY.